US005743514A

United States Patent [19]

Rees

[11] Patent Number: 5,743,514

[45] Date of Patent: Apr. 28, 1998

[54] SATURATED LACTONE PEROXIDE BLEACHING SOLUTIONS AND METHOD OF PREPARING AND USING THE SAME

[75] Inventor: Wayne M. Rees, Racine, Wis.

[73] Assignee: S. C. Johnson & Son, Inc., Racine, Wis.

[21] Appl. No.: 911,028

[22] Filed: Aug. 14, 1997

Related U.S. Application Data

[63] Continuation of Ser. No. 346,597, Nov. 29, 1994, abandoned.

[51] Int. Cl.$^{6}$ .......... C09K 3/00

[52] U.S. Cl. .......... 252/186.39; 252/186.38; 510/312

[58] Field of Search .......... 252/186.38, 186.39

[56] References Cited

U.S. PATENT DOCUMENTS

| | | | |
|---|---|---|---|
| 3,909,438 | 9/1975 | Nakagawa et al. | 252/186.38 |
| 4,613,452 | 9/1986 | Sanderson | 252/186.23 |
| 4,751,023 | 6/1988 | Stehlin et al. | 252/558 |
| 4,971,914 | 11/1990 | Lawrence | 436/66 |
| 5,151,212 | 9/1992 | Bell et al. | 252/186.38 |
| 5,215,675 | 6/1993 | Wilkins et al. | 252/100 |
| 5,241,026 | 8/1993 | Amati et al. | 526/229 |
| 5,334,331 | 8/1994 | Fusiak | 252/542 |

FOREIGN PATENT DOCUMENTS

| | | |
|---|---|---|
| 3206093 | 9/1983 | Germany . |
| 4231466 | 3/1994 | Germany . |
| 4-91271 | 3/1994 | Japan . |
| 836988 | 2/1956 | United Kingdom . |

*Primary Examiner*—Joseph D. Anthony
*Attorney, Agent, or Firm*—Laura L. Bozek

[57] ABSTRACT

A bleaching solution containing a peroxide and a saturated lactone bleaching enhancer in an alkaline medium is disclosed. Also disclosed is a bleaching system for forming the bleaching solution, as well as a method of preparing and using the bleaching solution. The bleaching solution may be employed as a cleaner for soiled hard surfaces, textiles and as a disinfectant.

20 Claims, No Drawings

SATURATED LACTONE PEROXIDE BLEACHING SOLUTIONS AND METHOD OF PREPARING AND USING THE SAME

This application is a continuation of application Ser. No. 08/346,597 filed Nov. 29, 1994 now abandoned.

BACKGROUND OF THE INVENTION

1. Field of the Invention

This invention relates to a bleaching solution containing a peroxide, an alkaline agent and a lactone which enhances the bleaching rate of the solution. The invention also relates to a bleaching system for forming the bleaching solution. The invention further relates to a method of preparing the bleaching solution and using the same.

2. Related Background Art

The use of peroxides, such as hydrogen peroxide, as bleaching agents is well known. However, it is advantageous to enhance the rate of bleaching provided by a peroxide. This is particularly so for commercial bleaching compositions used to clean hard or soft surfaces, such as mold stained tile, where the user desires a quick and effective treatment.

GB 836,988 discloses that the bleaching efficacy of inorganic per salts for laundry use at 50° to 60° C. may be improved by the addition of linear organic carboxylic ester compounds in an alkaline medium. Later attempts of peroxide activation have focused on enol esters as disclosed, for example, in U.S. Pat. No. 4,613,452. More recently, lactone analogs of enol esters have also been proposed as peroxy compound activators in DE Offerdegungsschrift 4231466. This reference discloses the use of lactone activators having five or six ring members wherein the carbon adjacent the ring oxygen has an endo- or exocyclic carbon-carbon double bond. None of these references suggest or disclose the use of saturated lactones, i.e., non-enol ester analogs, as per compound activators.

DE Offenlegungsschrift 3206093 discloses that reactive dyes or cellulose fibers can be after-treated with a $H_2O_2$ containing bleaching liquid by adding acid donors to drop the pH range from 10–13 to 6–9 at a solution temperature of 60°–95° C. Butyrolactone is disclosed as one of many potential acid donors. This reference does not recognize that saturated lactones can be used as bleach enhancers, but instead suggests their use as acid donors for treating dyed fabrics to improve the resulting color. This is particularly evident by the reference's use of low levels of hydrogen peroxide since the object of this invention is to improve color fastness and not to actually bleach or clean the fibers.

U.S. Pat. No. 3,909,438 describes a textile bleaching system utilizing beta-butyrolactone, a four-membered ring lactone. Gamma-butyrolactone is disclosed as a control in Comparative Example 2 of the '438 patent, the results of which illustrate that the gamma-butyrolactone provided essentially no bleach enhancement of tea stained cloth. Thus, there is no recognition that five or six-member ring saturated lactones are effective on hard surfaces, nor that any lactone other than four-member ring lactones would have cleaning efficacy on soft substrates. The '438 patent also teaches the use of four-member saturated ring lactones (in general) as bleach activators, several are cited, beta-butyrolactone being one.

Aqueous stripping compositions containing butyrolactone and hydrogen peroxide are known for use in stripping organic coatings such as paints and resins from substrates. For example, U.S. Pat. No. 5,215,675 discloses a composition containing peroxide and butyrolactone for removing resinous coatings from substrates. This reference, however, discloses that preferably acid co-activators are used to enhance the activity of the compositions and that the acids may be used with buffers to control the pH to about 3–4.5.

Another stripping composition containing N-methylpyrrolidone and gamma-butyrolactone is disclosed in U.S. Pat. No. 5,334,331. This reference suggests the use of hydrogen peroxide or acidic compounds, such as formic acid, as co-activators in such a stripping composition. Neither of these stripping composition references discloses or suggests the use of an alkaline agent to maintain the pH of the compositions at neutral or greater. To the contrary, both references disclose the use of acid co-activators which provide a composition having an acidic pH. Moreover, these references do not disclose or suggest the use of a lactone/peroxide solution in an alkaline environment for bleaching, cleaning or disinfecting hard or soft surfaces.

An object of this invention is to provide a novel bleaching solution having a highly effective bleaching rate.

Another object of this invention is to provide a novel bleaching system for forming an enhanced bleaching solution.

A further object of this invention is directed to a method of preparing the bleaching solution of this invention.

Another object of this invention is directed to a method of bleaching a substrate using the bleaching solution of this invention.

SUMMARY OF THE INVENTION

It has now been discovered that the use of particular saturated ring lactones, such as gamma-butyrolactone in combination with a peroxide, such as $H_2O_2$, in a neutral to alkaline environment provides a bleaching solution with significant bleaching rate enhancement over that obtained with equivalent levels of peroxide in identical alkaline solutions.

More particularly, this invention is directed to a bleaching solution comprising (i) a lactone represented by the formula (I):

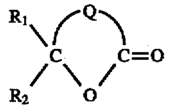

wherein $R_1$ and $R_2$ are independently selected from hydrogen, alkyl having 1 to 6 carbon atoms, alkoxy having 1 to 6 carbon atoms, aryl, aralkyl and hydroxy; and Q is an alkylene radical having 2 to 4 carbon atoms, any carbons of which may be substituted by any of an alkyl having 1 to 6 carbon atoms, alkoxy having 1 to 6 carbon atoms, alkene having 1 to 6 carbon atoms, aryl, aralkyl and hydroxy; (ii) a peroxide and (iii) an effective mount of at least one alkaline agent to provide said solution with a pH of at least about 7. The lactone may be substituted or unsubstituted and is preferably a lactone having a five to six-member cyclic ester ring. The most preferable lactones for use in this invention include gamma-butyrolactone and delta-valerolactone. Other exemplary lactones include the gamma and delta forms of gluconic acid, epsilon-caprolactam and gamma-valerolactone. The peroxide of this invention is preferably hydrogen peroxide. The alkaline agents of this invention are preferably alkali metal carbonates such as, for example, sodium carbonate, sodium bicarbonate, potassium carbonate or potassium bicarbonate. Other alkaline agents which may be employed this invention include, without limitation, alkali metal silicates, borates, phosphates or hydroxides; alkaline earth carbonates, hydroxides or oxides; ammonia, ethanolamines and sodium glycinate. The pH of the solution is at least about 7, preferably from about 9 to about 13 and most preferably from about 10 to about 12. The solution can be aqueous or non-aqueous, such as based on alcohols, glycols, glycol ethers and the like. Aqueous solutions are most preferred.

The bleaching solution of this invention is highly effective for bleaching mold stains on ceramic tiles and like surfaces. The inventive solution may also be employed for bleaching foods, beverages and general soil stains on other hard surfaces such as linoleum, as well as soft surfaces such as laundry and carpets.

A further aspect of this invention is directed to a bleaching system for forming the above-described bleaching solution. Most preferably, the system is comprised of (a) a first vessel containing a first solution comprising the previously described lactone of formula (I) and a peroxide and (b) a second vessel containing a second solution comprising at least one alkaline agent. The first and second vessels can be, for example, either two separate containers or two separate compartments within a single container. Preferably, the lactone/peroxide containing first solution is acidic, generally having a pH in the range from about 1 to about 5, and most preferably in the range from about 2 to about 4. The bleaching system is used to form the bleaching solution by mixing an effective amount of the first solution with an effective amount of the second solution to provide a bleaching solution having an enhanced bleaching rate with a pH of at least about 7. The bleaching solution is then applied to the surface of the substrate to be treated.

Another embodiment of the bleaching system of this invention is comprised of (a) a first vessel containing a solution comprised of the lactone described by formula (I) and (b) a second vessel containing a peroxide precursor which generates an alkaline agent upon mixture with the solution. Preferably, the lactone containing solution is weakly acidic, most preferably having a pH in the range of about 2 to about 4. The peroxide precursor is typically a solid material, preferably in powdered or granular form, which reacts upon mixture with the solution of the first vessel to form an alkaline agent resulting in a bleaching solution having a pH of at least about 7. Such exemplary peroxide precursors include, without limitation, sodium perborate or sodium percarbonate. In this embodiment the second vessel includes those containers capable of holding a solid material, such as for example, a bottle or a packet. The second vessel can be integrally united with the first vessel in a single unit or each vessel can be a separate container.

Another aspect of this invention is directed to a method of preparing a bleaching solution having an enhanced bleaching rate. This method comprises mixing the above described lactone of formula (I), a peroxide and an effective amount of at least one alkaline agent to provide a bleaching solution with a pH of at least about 7. Preferably, the alkaline agent is added to the bleach solution just prior to use of the solution. On the other hand, if the solution will be prepared and used quickly, the lactone can be added to an alkaline peroxide solution or the peroxide solution may be added to a solution of alkaline agent and lactone. Another method of preparing the bleaching solution of this invention includes mixing a lactone solution with a hydrogen peroxide precursor capable of generating an alkaline agent so as to provide a bleaching solution having a pH of at least about 7.

Additionally, this invention is also directed to a method of bleaching, cleaning or disinfecting a substrate by the application of a bleaching solution containing the lactone of formula (I) and a peroxide in a neutral to alkaline environment. The solution may be made neutral to alkaline prior to application by the addition of at least one alkaline agent or may be applied without addition of the alkaline agent to a substrate having an inherently alkaline surface. The solution may be applied to the substrate by wiping, mopping, spraying or the like in order to bleach, clean or disinfect the substrate.

DETAILED DESCRIPTION OF THE INVENTION

The novel bleaching solution of this invention contains a peroxide, the lactone of formula (I) and at least one alkaline agent. The enhanced bleaching rate of the inventive solution is exhibited when the pH of the solution is at least about 7.0 or greater.

The peroxide employed in the present invention may be a solution of hydrogen peroxide or a hydrogen peroxide precursor. If a peroxide precursor is employed then it is preferable to employ a neutral form, such as peroxy urea. While basic hydrogen peroxide precursors can be employed, they are not favored in solution form, since their use results in a solution having a limited shelf life. However, powdered or granular hydrogen peroxide precursors, such as sodium perborate or sodium percarbonate, which are capable of generating an alkaline agent upon solubilization can be advantageously employed in certain embodiments of this invention. Hydrogen peroxide is most preferred.

Generally, the peroxide is present in the solution in an amount in the range of about 0.4 to about 10 percent by weight of the total weight of the solution (% w/w). Unless specified otherwise, all concentrations herein are set forth as a weight percent of the total weight of the solution. Preferably, the mount of peroxide present in the solution is in the range from about 1.0 to about 5% w/w. Most preferably, the amount of peroxide present in the solution is in the range from about 2 to about 4% by weight.

The lactone employed in the inventive solution has a 5 to 7 membered cyclic ester ring. More particularly, the lactone of this invention is represented by the formula (I):

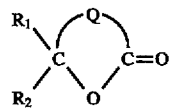

wherein $R_1$ and $R_2$ are independently selected from hydrogen, alkyl having 1 to 6 carbon atoms, alkoxy having 1 to 6 carbon atoms, aryl, aralkyl and hydroxy; and Q is an alkylene radical having 2 to 4 carbon atoms, wherein any of the carbon atoms may be substituted by any of an alkyl having 1 to 6 carbon atoms, alkoxy having 1 to 6 carbon atoms, alkene having 1 to 6 carbon atoms, aryl, aralkyl and hydroxy.

Preferably Q is an alkylene radical having 2 to 3 carbon atoms. The alkylene radical may be substituted as described above, although an unsubstituted alkylene radical is most preferred. The most preferred lactones of the present invention are gamma-butyrolactone, wherein Q is an unsubstituted alkylene radical having 2 carbons and $R_1$ and $R_2$ are hydrogen, and delta-valerolactone, wherein Q is an unsubstituted alkylene radical having 3 carbons and $R_1$ and $R_2$ are hydrogen. Preferably, the lactones employed in the present invention are present in an amount in the range of about 0.1 to about 10% w/w, and more preferably about 0.5 to about 5% w/w. Generally, however, any amount of the lactones of formula (I) which is effective to enhance the bleaching rate of the composition may be employed. It is also possible to employ mixtures of lactones in the present invention.

Without being held to any theory, it is believed that the lactones employed in the inventive solution enhance the bleaching rate of hydrogen peroxide by formation of a peroxy acid of the ring opened lactone in a neutral to alkaline environment. It is further believed that the peroxy acid so formed serves to enhance the bleaching rate of the inventive solution compared to a similar alkaline solution of hydrogen peroxide without the lactone.

Lactones having five to six-membered cyclic ester rings are known to be more stable than lactones having four or seven-membered rings and thus are preferred in the present invention. However, if the shelf life of the inventive bleaching solution is not required to be long, then the less stable lactones may be employed. gamma-butyrolactone is a relatively stable lactone and thus is highly preferred in the present invention.

The stability of the lactones, such as gamma-butyrolactone and delta-valerolactone, is dependent on the pH of the environment. Generally, lactones are more stable in acidic environments and tend to ring open to the corresponding hydroxy carboxylate soap compound as the environment becomes more basic. Similarly, hydrogen peroxide is more stable under acidic conditions than basic conditions. Accordingly, it is preferable to form the bleaching solutions of this invention shortly prior to use by the addition of at least one alkaline agent to a combination of the lactone and peroxide to bring the pH of the solution to at least about 7 or greater. It is believed that making the inventive solution basic drives the equilibrium of the solution to generate a greater amount of peroxy acid and thus improve the bleaching rate of the solution.

Any alkaline agent may be employed in the present invention which increases the pH of the solution without negatively affecting the bleaching rate enhancement of the inventive solution. Exemplary alkaline agents of the present invention include, without limitation, alkali metal carbonates, alkali metal silicates, borates, phosphates or hydroxides; alkaline earth carbonates, hydroxides or oxides; ammonia, ethanolmines and sodium glycinate. The most preferable alkaline agents are alkali metal carbonates and borates such as sodium carbonate, sodium bicarbonate, potassium carbonate, potassium bicarbonate, sodium borate and potassium borate. Generally, the bleaching solution of the present invention contains an mount of alkaline agent in the range from about 0.1 to about 20% w/w, and most preferably, in the range from about 0.5 to about 10% w/w.

The balance of the bleaching solution of the present invention may be aqueous or non-aqueous solvent. Preferably, the solution is aqueous. The aqueous solution of this invention will generally contain an amount of water in the range from about 50 to about 99% w/w, and preferably, from about 85 to about 98% w/w. Non-aqueous solvents may also be mixed with aqueous solutions by the addition, for example, of alcohols, glycols, glycol ethers and the like. On the other hand, such non-aqueous solvents may be employed in the inventive solution without the presence of water if so desired.

Other additives known in the bleaching, cleaning and disinfecting arts may be included in the inventive solution. Such additives, include, for example, builders, surfactants, colorants, fragrances and stabilizers.

As previously noted, the lactones and peroxide employed in the solution of the present invention are not stable under basic conditions because it is believed that the peroxy acid of the ring opened lactone is formed. The peroxy acid formed is highly reactive and does not have a long shelf life in basic solution. Accordingly, another aspect of this invention is directed to a bleaching system for conveniently forming the bleach solution of this invention just prior to or during application to the desired substrate in order to ensure that the solution provides an enhanced bleaching rate.

The preferred bleaching system of this invention is comprised of two vessels. The first vessel contains a first solution comprising the lactone described in formula (I) and a peroxide. The second vessel contains a second solution comprising at least one alkaline agent. The concentration of the components in the first and second solutions is selected so that when a given amount of the first solution is mixed with a given amount of the second solution a bleaching solution is obtained containing the lactone, peroxide and at least one alkaline agent in the concentrations previously described for the inventive solution. Thus, the concentrations of the components in the first and second solutions of the bleaching system of this invention will be dependent upon the ratio of the mixture of the two solutions. Once it is decided what fixed amount of the first solution is to be combined with a fixed amount of the second solution, then the determination of the amounts of each component in each solution is a simple arithmetic calculation, i.e., a routine calculation to those having ordinary skill in the art.

In another embodiment of the bleaching system of this invention the first vessel contains a solution comprising the lactone described in formula (I) and the second vessel contains a peroxide precursor. The peroxide precursor is a solid material, preferably in powdered or granular form, which generates an alkaline agent upon mixing the precursor with the lactone containing solution. Preferably, the lactone containing solution is weakly acidic, most preferably having a pH in the range of about 2 to 4. The concentration of the lactone solution in the first vessel will be dependent on the amount that will be mixed with a given amount of peroxide precursor in the second vessel. Again the concentration of the lactone solution and the predetermined amounts from each vessel to be mixed can be readily calculated to ensure that the bleaching solution of this invention is formed upon mixing the components of each vessel.

The vessels employed in the bleaching system of this invention can each be separate containers or can be a single container having two compartments. For instance, a single container having two compartments or vessels holding the first and second solutions and having a pump line inserted into each compartment and merging at a single pump spray mechanism may be employed. On the other hand, the bleaching systems of this invention can simply consist of two separate containers holding the first and second solutions which can be mixed by adding a predetermined amount of one solution to a predetermined amount of the other. Other delivery mechanisms which provide a means for mixing the components of the bleaching solution of this invention are also contemplated. Exemplary containers for use with the bleaching system of this invention are disclosed in copending U.S. patent application Ser. No. 08/109,872, filed Aug. 20, 1993, entitled "Assembly for Simultaneous Dispensing of Multiple Fluids", the disclosure of which is incorporated by reference as if fully set forth herein.

The present invention is also directed to the method of preparing the bleaching solution of this invention. The method comprises the steps of forming a lactone/peroxide mixture by mixing a lactone having a five to seven-member cyclic ester ring described by formula (I) with a peroxide and adding an effective mount of at least one alkaline agent to said lactone/peroxide mixture to form a bleaching solution having a pH of at least about 7. The lactone/peroxide mixture is prepared by mixing the above-described components to form the bleaching solution having component concentrations equivalent to those previously described. Preferably, the lactone/peroxide mixture is an aqueous solution. It is also preferable to add the alkaline agent in the form of an aqueous solution. The bleaching solution of this invention can also be prepared by first mixing either the peroxide or lactone with alkaline agent. However, this is not preferred since the self-life of solutions prepared in this manner is limited.

In addition, it is preferable to include an acid in the lactone/peroxide mixture in order to foster the stability of that mixture. An exemplary acid is citric acid. Other exemplary acids include acetic acid, hydroxyacetic acid, lactic acid, polyacrylic acid, malic acid, sulfonic acid, sulfuric acid and phosphoric acid. When employed, the acid is present in the lactone/peroxide mixture in the range of about 0.01 to about 1 percent by weight of the lactone/peroxide mixture. Generally an amount of acid is added to the lactone/peroxide mixture to provide the mixture with a pH between about 2 and about 4.

The invention is further directed to a method of bleaching, cleaning and/or disinfecting a substrate. The method comprises the steps of (i) preparing a bleaching solution comprising a lactone having a five to seven-member cyclic ester ring described by formula (I) and a peroxide and (ii) applying the solution to the substrate, wherein the pH of the solution after application to the substrate is at least about 7. The critical step in the inventive method requires that the lactone/peroxide mixture achieve a pH of at least about 7. This can be accomplished prior to application of the bleaching solution or after the bleaching solution has been applied. One manner, as previously discussed, of achieving the appropriate pH is to add at least one alkaline agent to the bleach solution prior to application in an amount effective to result in a solution having a pH of at least about 7. On the other hand, an effective mount of at least one alkaline agent could be added to the bleach solution after the bleach solution has been applied to a substrate. If the substrate is inherently alkaline, such as, for example, cementitious surfaces, then the method may be practiced without the addition of an alkaline agent.

The bleach solution of this invention and the method of using the same may be employed, for example, to bleach mold and mildew on hard or soft surfaces. Other potential uses include use as a spot and stain remover from fabrics and possibly as a disinfectant.

The examples which follow are intended as an illustration of certain preferred embodiments of the invention. Other variations and modifications of this invention will be obvious to those skilled in the art.

EXAMPLE 1

An aqueous solution of 10% gamma-butyrolactone, 6% $H_2O_2$ and 0.1% citric acid was prepared by sequentially adding 300 g deionized water, 50.0 g gamma-butyrolactone (Arco Chemical Co., Newton Square, Pa.), 85.7 g $H_2O_2$ (35% aqueous solution, Interox) and 0.5 g citric acid followed by bringing the solution to a total of 500 g with deionized water. The resulting solution had a pH of 2.75 at 25° C.

COMPARATIVE EXAMPLE 1

An aqueous solution of 3% $Na_2CO_3$ and 3% $H_2O_2$ was prepared by adding 10.0 g $Na_2CO_3$ (6% aqueous solution) and 1.71 g $H_2O_2$ (35% aqueous solution, Interox) to 8.3 g deionized water.

EXAMPLE 2

An aqueous bleaching solution of 5% gamma-butyrolactone, 3% $Na_2CO_3$, 3% $H_2O_2$ was prepared by adding 10 g of 6% aqueous $Na_2CO_3$ to 10 g of the gamma-butyrolactone/$H_2O_2$/citric acid solution prepared in Example 1. The solution of this example and the solution of Comparative Example 1 were tested for bleaching effectiveness by applying approximately 1 ml of each solution to segregated areas of a 5 cm×5 cm mold stained ceramic tile. The stained tiles were prepared by applying a concentrated aqueous suspension of dispersed *Aspergillus niger* (ATCC 6275) mold spores to the porous surface of 10 cm×10 cm white ceramic tiles. The mold dispersion was applied as a free spray using Preval sprayers (#465, precision Valve Corp., Yonkers, N.Y.) until the color of the tile surface appeared medium brown. The tiles were then air dried at room temperature for 24 hours, and cut into smaller 5 cm×5 cm sections prior to use. Visual observations of the bleaching efficiency of each solution applied to the tiles at room temperature (23°–25° C.) are set forth in Table 1.

TABLE 1

| Time After | Visual Appearance | |
|---|---|---|
| Application | Comparative Example 1* | Example 2 |
| 1 min. | No change, medium brown color | Bleached to a light tan color |
| 6 min. | Slight change, lighter brown color | Nearly white, very light tan color |
| 21 min. | Somewhat bleached, light brown | Bleached white |

*77 min. after application - light tan color

COMPARATIVE EXAMPLE 2

An aqueous solution of 4% $NaHCO_3$, 1% $Na_2CO_3$ and 3% $H_2O_2$ was prepared by mixing 10.0 g of an 8% $NaHCO_3$/2% $Na_2CO_3$ aqueous solution and 1.71 g of 35% aqueous $H_2O_2$ with 8.30 g of deionized water.

EXAMPLE 3

A 5% gamma-butyrolactone/3% $H_2O_2$/4% sodium bicarbonate/1% sodium carbonate aqueous bleaching solution was prepared by adding 10.0 g of an 8% $NaHCO_3$/2% $Na_2CO_3$ aqueous solution to 10.0 g of the solution prepared in Example 1. The pH of the resulting solution was 8.8. The bleaching solution was tested for bleaching efficiency against the solution prepared in Comparative Example 2 on mold stained tile in the same manner as previously indicated. The restfits of those tests are shown in Table 2 below.

TABLE 2

| Time After | Visual Appearance | |
|---|---|---|
| Application | Comparative Example #2* | Example #3 |
| 2 min. | No change, dark–medium brown | color changed to a light brown |
| 10 min. | slight color change, light–medium brown | almost completely bleached, light tan color |
| 20 min. | slightly bleached, light brown color | bleached, white color |

*60 min. after application - medium tan color

COMPARATIVE EXAMPLE 3

An aqueous 3% hydrogen peroxide solution was prepared by mixing 1.71 g of 35% stabilized $H_2O_2$ with 18.30 g of deionized water.

COMPARATIVE EXAMPLE 4

An aqueous solution containing 5% gamma-butyrolactone and 3% $H_2O_2$ was prepared by mixing 10 g of the gamma-butyrolactone/$H_2O_2$/citric acid aqueous solution of Example 1 with 10 g deionized water. This aqueous solution did not contain an alkaline agent. The pH of the resulting solution was 2.98 at 25° C. The bleaching efficiency of the solutions of Comparative Examples 3 and 4 were tested on mold stained tile by the method previously described. Seven minutes after application both treated areas showed no color change and remained a medium brown color. After 28 minutes had elapsed, both treated areas showed only a very slight lightening of color, both having a light-medium brown color. The test results of Comparative Example 4 indicate a gamma-butyrolactone/$H_2O_2$ aqueous solution is not effective at bleaching mold stains when the pH of the solution is acidic.

COMPARATIVE EXAMPLE 5

A first solution containing 5% gamma-butyrolactone and 5.7% $Na_2CO_3$ was prepared by mixing 95.0 g of a 6% $Na_2CO_3$ aqueous solution with 5.0 g gamma-butyrolactone. A second solution containing 5% gamma-butyrolactone, 3.8% $NaHCO_3$ and 1% $Na_2CO_3$ was prepared by mixing 95.0 g of a 4% $NaHCO_3$/1% $Na_2CO_3$ aqueous solution with 5.0 g gamma-butyrolactone. The two solutions were then tested on mold stained tile in the same manner as previously described. Even 43 minutes after application there was no observable color change for either section of treated stained tile. The results obtained with the solutions of this example taken in conjunction with those of Example 3 and Comparative Example 4 indicate that bleaching rate enhancement is obtained when the lactone and $H_2O_2$ are combined in an alkaline environment.

EXAMPLE 4

Two solutions were prepared by adding with stirring the following components in the order listed:

Solution #1

85.0 g of 6% $Na_2CO_3$ (aqueous)
5.0 g of gamma-butyrolactone
10.0 g of 35% $H_2O_2$ (aqueous)

Solution #2

85.0 g of 4% $NaHCO_3$/1.0% $Na_2CO_3$ (aqueous)
5.0 g of gamma-butyrolactone
10.0 g of 35% $H_2O_2$ (aqueous)

Approximately 1.5 ml of each solution were immediately applied to a mold stained tile as previously described. The area of the tile to which Solution #1 (5% gamma-butyrolactone/5% $Na_1CO_3$/3.5% $H_2O_2$) was applied lightened to a light tan-brown in approximately two minutes while the area to which Solution #2 (5% gamma-butyrolactone/0.9% $Na_2CO_3$/3.4% $NaHCO_3$/3.5% $H_2O_2$) was applied reached a light tan-brown color in about five minutes. Both sample areas were completely bleached within approximately 25 minutes of the initial application.

EXAMPLE 5

An aqueous solution was prepared by adding sequentially with stirring 300.0 g deionized water, 85.7 g of Interox 35% $H_2O_2$, 50.0 g gamma-butyrolactone and 0.50 g of citric acid, followed by the addition of deionized water to bring the solution to a total of 500.0 g. The pH of the prepared solution was 2.80 at 25° C.

EXAMPLE 6

An aqueous bleaching Solution C containing 5% gamma-butyrolactone/3% $Na_2CO_3$ and 3% $H_2O_2$ was prepared by mixing 10 g of the gamma-butyrolactone/$H_2O_2$/citric acid aqueous solution prepared in Example 5 with 10.0 g of an aqueous solution of 6% $Na_2CO_3$ ($5.7\times10^{-3}$ mol $CO_3^{2-}$). The pH of solution C was 9.60 at 25° C. An aqueous bleaching Solution D containing 5% gamma-butyrolactone, 6% $K_2CO_3$ and 3% $H_2O_2$ was prepared by mixing 10 g of the above-described gamma-butyrolactone containing solution with 10 g of an aqueous solution of 12% $K_2CO_3$ ($8.7\times10^{-3}$ mol $CO_3^{2-}$). The pH of Solution D was 9.92 at 25° C. Both Solutions C and D were tested for bleaching efficiency on mold stained tile as previously described. The results of those tests are set forth in Table 3 below.

TABLE 3

| Time After | Visual Appearance | |
|---|---|---|
| Application | Solution C | Solution D |
| 6 min. | light–medium tan color | cream color (nearly completely bleached) |
| 10 min. | light tan | completely bleached white |
| 26 min. | completely bleached | completely bleached |

These results illustrate that the greater the ability of the carbonate buffer to resist pH drops (upon reagent solution combination and as the solution diffuses through the porous ceramic) the greater the observed bleaching rate.

EXAMPLE 7

An aqueous bleaching Solution E (5% gamma-butyrolactone/0.25% Olin CS-1 and 3% $H_2O_2$) containing an anionic surfactant was prepared by mixing 10.0 g of a 12% $K_2CO_3$ aqueous solution containing 0.50% of Olin CS-1 (a polycarboxylated anionic surfactant, 50% active in water) with 10 g of the gamma-butyrolactone/$H_2O_2$/citric acid aqueous solution prepared in Example 1. Another Solution F (6% $K_2CO_3$, 0.25% Olin CS-1 and 3% $H_2O_2$) was prepared by mixing 10.0 g of the above-described $K_2CO_3$ solution with 1.71 g of 35% $H_2O_2$ (aqueous) and 8.30 g of deionized water. Each solution was tested for bleaching efficiency, as previously described, by applying approximately 1.5 ml of each to separate areas of a 5 cm×5 cm mold stained tile, initially medium brown in color. The results of these tests are shown in Table 4 below.

TABLE 4

| Solution E | | Solution F* | |
|---|---|---|---|
| Time After Application | Visual Appearance | Time After Application | Visual Appearance |
| 2 min. | tile bleached to a light tan | 4 min. | light brown color, modest bleaching |
| 6 min. | tile bleached to a very light cream color | 13 min. | light brown, moderate bleaching (slightly lighter than at 4 min.) |
| 10 min. | tile completely bleached white | 30 min. | medium tan (sand) color |

*After 73 min. - cream color

The test results illustrate that the enhanced bleaching efficiency of the inventive composition was not negatively effected by the presence of an anionic surfactant.

EXAMPLE 8

A dual solution mold remover was prepared by loading a dual solution bottle with 200 ml of the aqueous $H_2O_2$/gamma-butyrolactone/citric acid solution prepared in Example 6 and 200 ml of an alkaline solution prepared by mixing 120.0 g of $K_2CO_3$, 5.0 g Olin CS-1 (a polycarboxylated anionic surfactant, 50% actives in water) and 12.5 g Stepan Bio-Terge PAS-8S (sodium octyl sulfonate, 40% actives in water) in deionized water to give a 1000.0 g clear single phase alkaline solution have a pH of 11.8 at 24° C. The dual solution mold remover was tested by spraying the solution four times onto a 2 in×2 in medium brown mold stained tile (total application about 3.6 g of the dual solution) at room temperature (23°–25° C.). Within 2 minutes after application, the tile was mostly bleached (light tan color), after 5 minutes the tile was nearly completely bleached (light cream color) and after 10 minutes the tile was completely bleached (off white). When the dual solution was applied in a similar manner to a tile having a black-grey mold stain, where mold was grown on the tile surface, the tile was completely bleached after 20 minutes. The mold grown tiles were prepared by inoculating the tiles with a concentrated *Aspergillus niger* (ATCC 6275) spore solution which had been previously diluted with sterile Czapeks Dox broth. The inoculated tiles were then incubated for 2 to 3 weeks at 95% relative humidity (28° C.), producing grey-black mold growth on the tile surface.

EXAMPLE 9

An alkaline surfactant solution was prepared by sequentially adding 800.0 g of deionized water, 120.0 g of $K_2CO_3$, 10.0 g of NaOH, 12.5 g of Stepan PAS-8S Bio-Terge (sodium octyl sulfonate, 40% actives in water), 5.0 g of Olin SL-22 (a nonionic surfactant, 100% activates and bringing the total solution to 1000.0 g with deionized water. The resulting alkaline solution was a clear pale yellow single phase solution having a pH of 13.48 at 25° C. An aqueous bleaching Solution G was prepared by mixing 10 g of the alkaline solution with 10 g of the aqueous $H_2O_2$/gamma-butyrolactone/citric acid solution prepared in Example 5. A comparative Solution H was then prepared by mixing 10 g of the alkaline solution with 8.30 g of deionized water and 1.71 g of 35% Interox $H_2O_2$. Solution G and Comparative Solution H were tested as previously described on mold stained tiles (sprayed) and the results are set forth in Table 5.

TABLE 5

| Solution G | | Comparative Solution H | |
|---|---|---|---|
| Time After Application | Visual Appearance | Time After Application | Visual Appearance |
| 2 min. | light tan color | 4 min. | light brown color |
| 4 min. | light cream color | 30 min. | light tan color |
| 7 min. | white, bleaching complete | 80 min. | light cream, bleaching near complete |

EXAMPLE 10

An aqueous bleaching Solution I was prepared by mixing (i) 10 g of a lactone solution containing 10% w/w gamma-valerolactone (Aldrich Chemical Co.), 6% w/w $H_2O_2$ and 0.2% citric acid in deionized water with (ii) 10 g of an alkaline solution (pH=13.5 at 25° C.) containing 12% w/w $K_2CO_3$, 1% w/w NaOH, 0.5% w/w Olin CS-1 (a polycarboxylated ionic surfactant, 50% actives in water) and 0.5% w/w Stepan Bio-Terge PAS-8S (sodium octyl sulfonate, 40% actives in water) in deionized water. Aqueous bleaching Solutions J and K containing, respectively, delta-valerolactone and epsilon-caprolactam instead of gamma-valerolactone were similarly prepared. Thus, each solution was comprised of 5% lactone, 3% $H_2O_2$, 6% $K_2CO_3$, 0.5% NaOH, 0.25% Olin CS-1 and 0.25% Stepan Bio-Terge PAS-8S. The resulting solutions were tested for bleaching efficacy by separately applying about 1.5 ml of each to one half of a two inch by two inch mold stained tile (sprayed) at 25° C. and observing the bleaching as a function of time. Solution I, containing the gamma-valerolactone, nearly completely bleached the mold stained tile in 12 minutes, while Solution J, containing the delta-valerolactone, was extremely effective, bleaching the tile completely within 4 minutes after application. Solution K (epsilon-caprolactam) completely bleached the mold stained tile after 20 minutes. The results indicate that a bleach solution enhanced with delta-valerolactone was almost twice as effective as similarly prepared solutions employing gamma-butyrolactone.

COMPARATIVE EXAMPLE A

An aqueous bleaching Solution X was prepared according to Comparative Example 2 of U.S. Pat. No. 3,909,438, by sequentially mixing (i) 990 g of deionized water at 40° C., (ii) 5.0 g sodium percarbonate, (iii) 1.70 g of sodium dodecylbenzenesulfate (30% actives) and 5.0 g deionized water. Aqueous bleaching solutions Y, Z, ZA and ZB containing respectively beta-butyrolactone, gamma-butyrolactone, gamma-valerolactone, and delta-valerolactone were similarly prepared by substituting 5.0 g lactone for the 5.0 g of deionized water used in solution X. Thus, each bleaching solution was comprised of about 0.05% sodium dodecylbenzene sulfonate, 0.50% sodium percarbonate, and 0.50% lactone (for solutions Y, Z, ZA and ZB).

A separate 10 cm by 20 cm tea stained cotton cloth was immersed in each of the bleaching solutions and kept at 40° C. with stirring for 30.0 minutes. Directly thereafter, each cloth is removed from the bleaching solution, rinsed with deionized water and air dried. The bleaching power of each solution was determined using difference reflectivity between the thus treated cloth and the original tea-stained cloth. The original tea-stained cloth was prepared by soaking in a tea solution at 85°–91° C. for four hours, followed by air drying, rinsing with deionized water, air-drying a second time, and ironing. Reflectance colorimetric measurements were obtained using a Minolta CR-310 Chroma Meter. Measurements were taken using the CIE L*a*b* color scale and are expressed in units of ΔE*, total color difference between the original and bleached tea stained cotton swatch. Larger ΔE* values indicate a greater extent of bleaching. The results are set forth in Table 6. The resulting ΔE* values are mean values of four measurements taken on different sections of the stained swatch.

TABLE 6

| Bleaching Solution | ΔE* |
|---|---|
| X | 11.3 +/− .2 |
| Y | 15.9 +/− .1 |
| Z | 10.9 +/− .3 |
| ZA | 9.9 +/− .2 |
| ZB | 11.1 +/− .1 |

Since essentially no bleaching enhancement on textiles is shown for the gamma-butyrolactone solution compositions as described in U.S. Pat. No. 3,909,438 (Z) relative to the control "Solution X", one of ordinary skill would have no incentive to utilize gamma-butyrolactone to bleach stains on textiles or other substrates such as ceramic tile.

COMPARATIVE EXAMPLE B

An aqueous bleaching Solution R, as described in U.S. Pat. No. 3,909,438 was prepared by sequentially mixing (I) 0.17 g of an aqueous solution of sodium dodecylbenzenesulfonate (30% actives), (ii) 99 g of deionized water, (iii) 0.50 g of sodium percarbonate and (iv) 0.50 g of deionized water. Aqueous bleaching Solutions S, T, U, V and W containing respectively beta-butyrolactone, gamma-butyrolactone, delta-valerolactone, gamma-valerolactone and epsilon—caprolactone are similarly prepared by substituting 0.50 g of lactone for the 0.50 g of deionized water used in Solution R. Thus, each bleaching solution was comprised of about 0.05% sodium dodecylbenzenesulfonate, 0.50% sodium percarbonate, and 0.50% lactone (for Solutions S through W). Bleaching solutions R through W had a pH in the range of from about 10.0 to about 10.5. The resulting solutions were tested for bleaching efficacy by separately applying about 1.5 ml of each to one half of a 5 cm×5 cm mold stained tile (sprayed stain) at 25° C. and observing bleaching as a function of time. The results are set forth in Table 7.

TABLE 7

| Bleaching Solution | Time After Application | Visual Appearance |
|---|---|---|
| R | 2.0 min | medium brown |
| | 10.0 min | medium brown |
| | 20.0 min | medium brown |
| | 40.0 min | light-medium brown |
| | 60.0 min | light-medium brown |
| S | 30 seconds | light brown |
| | 2.0 min | tan |
| | 5.0 min | light tan |
| | 10.0 min | cream |
| | 20.0 min | off-white, bleaching complete |
| T | 2.0 min | medium brown |
| | 10.0 min | medium brown |
| | 20.0 min | light-medium brown |
| | 60.0 min | light-medium brown |
| U | 2.0 min | medium brown |
| | 10.0 min | light-medium brown |
| | 20.0 min | light-medium brown |
| | 60.0 min | light-medium brown |
| V | 2.0 min | medium brown |
| | 30.0 min | medium brown |
| | 60.0 min | medium brown |
| W | 2.0 min | medium brown |
| | 30.0 min | medium brown |
| | 60.0 min | medium brown |

As shown above, the beta-butyrolactone is a highly effective activator, completely bleaching the stained tile (initially medium brown) in 20 minutes treatment time. However, all other lactones tested failed to give any significant bleaching enhancement relative to the control under the conditions tested. All other tiles were either medium brown or light-medium brown after 1.0 hour of treatment (the control, deionized water added, was light-medium brown after 1.0 hour treatment time). Since the results of the five-membered ring lactone were also poor on textile stains, as shown in Comparative Example A and as in Comparative Example 2 of U.S. Pat. No. 3,909,438, there is no incentive for one of ordinary skill to utilize a five, six or seven-membered ring lactone as in a cleaning composition for soft surfaces such as textiles or hard surfaces such as mold and mildew removal on tiles.

COMPARATIVE EXAMPLE C

An aqueous bleaching Solution L, was prepared by sequentially mixing (I) 30 g of an alkaline solution containing 12% w/w $K_2CO_3$ in deionized water, (ii) 30 g of an aqueous solution containing 6% w/w $H_2O_2$ in deionized water, and (iii) 3.0 g of deionized water. Aqueous bleaching Solutions M, N, O, P and Q containing respectively, gamma-butyrolactone, delta-valerolactone, gamma-valerolactone, epsilon-caprolactone, and beta-butyrolactone are similarly prepared by substituting 3.0 g lactone for the 3.0 g deionized water used in bleaching Solution L. Thus, each solution was comprised of about 3.0% w/w $H_2O_2$, 6% w/w $K_2CO_3$, and 5.0% w/w lactone (for Solutions M through Q). The resulting solutions were tested for bleaching efficacy by separately applying about 1 ml of each to about 2 cm×5 cm sections of mold stained tiles (sprayed stain) at 25° C. and observing bleaching as a function of time. The results are set forth in Table 8.

TABLE 8

| Bleaching Solution | Time After Application | Visual Appearance |
|---|---|---|
| L | 4.0 min | light-medium brown |
| | 20.0 min | tan |
| | 40.0 min | light tan |
| | 60.0 min | cream |
| M | 2.0 min | light tan |
| | 4.0 min | cream |
| | 8.0 min | off-white, bleaching complete |
| N | 1.0 min | light tan |
| | 2.0 min | cream |
| | 3.0 min | off-white, bleaching complete |
| O | 2.0 min | light brown |
| | 8.0 min | light tan |
| | 12.0 min | cream |
| | 16.0 min | off-white, bleaching complete |
| P | 2.0 min | light brown |
| | 10.0 min | light tan |
| | 15.0 min | cream |
| | 20.0 min | off-white, bleaching complete |
| Q | 30 seconds | light cream |
| | 45 seconds | off-white, bleaching complete |

As expected, the ring strain present in the four-member ring; beta-butyrolactone, renders the molecule highly reactive towards opening with $OOH^-$ (hydroperoxy anion), thus making it a superior activator (Solution Q). However, its intrinsic high reactivity with water renders it unsuitable for use in an aqueous product where long term stability in an aqueous solution is desired, especially for consumer products.

I claim:

1. A method of improving the bleaching performance of a peroxide comprising the step of applying a bleaching solution to a substrate, the bleaching solution comprising (i) from about 0.1% to about 10% by weight of a lactone represented by the formula (I):

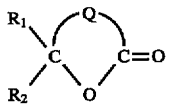

wherein $R_1$ and $R_2$ are independently selected from the group consisting of hydrogen, alkyl having 1 to 6 carbon atoms, alkoxy having 1 to 6 carbon atoms, aryl, and aralkyl and Q is an alkylene radical having 2 to 4 carbon atoms, any carbons of which may be substituted by any of an alkyl having 1 to 6 carbon atoms, alkoxy having 1 to 6 carbon atoms, alkene having 1 to 6 carbon atoms, aryl, aralkyl and hydroxy (ii) from about 1% to about 10% by weight of hydrogen peroxide; (iii) an effective amount of at least one alkaline agent to provide said solution with a pH of at least about 7; and (iv) the balance comprising a solvent, wherein said lactone is present in an amount effective to increase a bleaching rate of the bleaching solution compared to the bleaching solution if said lactone were absent.

2. The method according to claim 1, wherein the peroxide is present in an amount in the range of from about 1.0% to about 5.0% by weight.

3. The method as claimed in claim 1, wherein the peroxide is present in an mount in the range of from about 2.0% to about 4.0% by weight.

4. The method according to claim 1, wherein Q is an alkylene radical having 2 to 3 carbon atoms.

5. The method according to claim 1 wherein the $R_1$ and $R_2$ are hydrogen.

6. The method according to claim 1 wherein the lactone is delta-valerolactone or gamma-butyrolactone.

7. The method according to claim 1 wherein the at least one alkaline agent is selected from the group consisting of alkali metal carbonates, alkali metal silicates, alkali metal borates, alkali metal phosphates, alkali metal hydroxides, alkaline earth carbonates, alkaline earth hydroxides, alkaline earth oxides, ammonia, ethanolamines, sodium glycinate and mixtures thereof.

8. The method according to claim 1 wherein the at least one alkaline agent is selected from the group consisting of sodium carbonate, sodium bicarbonate, potassium carbonate, sodium carbonate and mixtures thereof.

9. The method according to claim 1, wherein the pH is in a range from about 7 to about 13.

10. The method according to claim 1, wherein the bleaching solution further comprises an amount of acid in the range from about 0.01 to about 1 weight percent, based on the total weight of the solution.

11. The method according to claim 1, wherein the acid is selected from the group consisting of citric acid, acetic acid, hydroxyacetic acid, lactic acid, malic acid, sulfamic acid, sulfuric acid, phosphoric acid and mixtures thereof.

12. The method according to claim 1, wherein the solvent is water.

13. The method according to claim 1 wherein the bleaching solution comprises (i) gamma-butyrolactone in an amount from about 0.1 to about 10 weight percent, based on the total weight of the solution, (ii) hydrogen peroxide in an amount from about 1 to about 10 weight percent, based on the total weight of the solution and (iii) an effective amount of an alkaline agent to provide said solution with a pH of at least about 7, wherein said alkaline agent is selected from the group consisting of sodium bicarbonate, sodium carbonate, potassium bicarbonate, potassium carbonate and mixtures thereof.

14. A method for preparing a bleaching solution comprising the steps of combining (i) from about 0.1% to about 10% by weight of a lactone represented by the formula (I):

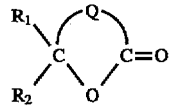

wherein $R_1$ and $R_2$ are independently selected from the group consisting of hydrogen, alkyl having 1 to 6 carbon atoms, alkoxy having 1 to 6 carbon atoms, aryl, and aralkyl; and Q is an alkylene radical having 2 to 4 carbon atoms, any carbons of which may be substituted by any of an alkyl having 1 to 6 carbon atoms, alkoxy having 1 to 6 carbon atoms, alkene having 1 to 6 carbon atoms, aryl, aralkyl and hydroxy, and (ii) from about 1% to about 10% by weight of hydrogen peroxide; and then adding (iii) an amount of at least one alkaline agent effective to form said bleaching solution having a pH of at least about 7; and (iv) the balance comprising a solvent, wherein said lactone is present in an amount effective to increase a bleaching rate of the bleaching solution compared to the bleaching solution if said lactone were absent.

15. The method according to claim 14, wherein Q is an alkylene radical having 2 to 3 carbon atoms.

16. The method according to claim 14, wherein $R_1$ and $R_2$ are hydrogen.

17. The method according to claim 14, wherein the lactone is gamma-butyrolactone or delta-valerolactone.

18. The method according to claim 14, wherein the pH is in a range from about 7 to about 13.

19. The method according to claim 14, further comprising the step of adding an acid to the lactone/peroxide mixture.

20. The method according to claim 19, wherein the acid is selected from the group consisting of citric acid, acetic acid, hydroxyacetic acid, lactic acid, malic acid, sulfamic acid, sulfuric acid, phosphoric acid and mixtures thereof.

* * * * *

UNITED STATES PATENT AND TRADEMARK OFFICE

CERTIFICATE OF CORRECTION

PATENT NO. : 5,743,514
DATED : Apr. 28, 1998
INVENTOR(S) : Wayne M. Rees

It is certified that error appears in the above-identified patent and that said Letters Patent is hereby corrected as shown below:

Column 1, line 32, please substitute "Offerdegungsschrift" with --Offenlegungsschrift--.

Column 2, line 56, please substitute "mount" with --amount--.

Column 4, line 37, please substitute "mount" with --amount--.

Column 5, line 45, please substitute "ethanolmines" with --ethanolamines--.

Column 5, line 50, please substitute "mount" with --amount--.

Column 7, line 3, please substitute "mount" with --amount--.

Column 7, line 41, please substitute "mount" with --amount--.

UNITED STATES PATENT AND TRADEMARK OFFICE

CERTIFICATE OF CORRECTION

PATENT NO. : 5,743,514
DATED : Apr. 28, 1998
INVENTOR(S) : Wayne M. Rees

It is certified that error appears in the above-identified patent and that said Letters Patent is hereby corrected as shown below:

Column 8, line 15, please substitute "free" with --fine--.

Column 8, line 49, please substitute "restfits" with --results--.

Column 9, line 56, please substitute "$Na_1CO_3$" with --$Na_2CO_3$--.

Column 12, line 1, please substitute "ionic" with --anionic--.

In the Claims:

Claim 3, line 2, please substitute "mount" with --amount--.

Signed and Sealed this

Seventeenth Day of April, 2001

Attest:

Nicholas P. Godici

NICHOLAS P. GODICI

*Attesting Officer*

*Acting Director of the United States Patent and Trademark Office*